United States Patent
Bolin (10) Patent No.: US 7,511,681 B2
(45) Date of Patent: Mar. 31, 2009

(54) SWITCHABLE ANTENNA ARRANGEMENT (75) Inventor: Thomas Bolin, Lund (SE)

(73) Assignee: Sony Ericsson Mobile Communications AB, Lund (SE)

(*) Notice: Subject to any disclaimer, the term of this patent is extended or adjusted under 35 U.S.C. 154(b) by 429 days.

(21) Appl. No.: 10/549,054

(22) PCT Filed: Mar. 2, 2004

(86) PCT No.: PCT/EP2004/002088

§ 371 (c)(1),
(2), (4) Date: Apr. 5, 2006

(87) PCT Pub. No.: WO2004/084427

PCT Pub. Date: Sep. 30, 2004

(65) Prior Publication Data

US 2007/0018895 A1    Jan. 25, 2007

Related U.S. Application Data (60) Provisional application No. 60/460,022, filed on Apr. 3, 2003, provisional application No. 60/457,150, filed on Mar. 24, 2003.

(30) Foreign Application Priority Data

Mar. 19, 2003  (EP) .................................. 03006033

(51) Int. Cl.
*H01Q 13/00* (2006.01)

(52) U.S. Cl. ...................................... 343/876; 343/702

(58) Field of Classification Search ................. 343/876, 343/860–861, 702, 700 MS
See application file for complete search history.

(56) References Cited

U.S. PATENT DOCUMENTS

| 5,649,306 | A    |    | 7/1997  | Vannatta et al.              |
|-----------|------|----|---------|------------------------------|
| 6,765,540 | B2   | *  | 7/2004  | Toncich ................. 343/860 |
| 6,781,544 | B2   | *  | 8/2004  | Saliga et al. ........ 343/700 MS |
| 6,882,320 | B2   | *  | 4/2005  | Park et al. ............. 343/702 |
| 7,136,018 | B2   | *  | 11/2006 | Iguchi et al. ........... 343/702 |
| 7,180,467 | B2   | *  | 2/2007  | Fabrega-Sanchez et al. . 343/861 |
| 7,221,327 | B2   | *  | 5/2007  | Toncich ................. 343/860 |
| 7,394,430 | B2   | *  | 7/2008  | Poilasne et al. ........ 343/702 |

FOREIGN PATENT DOCUMENTS

| DE | 19719657 A   | 8/1998 |
| EP | 0556010 A    | 8/1993 |
| EP | 0771082 A    | 5/1997 |
| EP | 0905915 A    | 3/1999 |
| EP | 0924810 A    | 6/1999 |
| WO | WO 02/01741 A| 1/2002 |

* cited by examiner

*Primary Examiner*—Huedung Mancuso
(74) *Attorney, Agent, or Firm*—Myers Bigel Sibley & Sajovec, PA (57) ABSTRACT

An antenna arrangement for a portable communication apparatus includes a main antenna connectable to an antenna input, a receive antenna connectable to an antenna output, an external antenna connector for receiving a terminal of an auxiliary antenna, an antenna detector arranged to detect the terminal when it is connected to the external antenna connector, a switch adapted to connect either the receive antenna or the external antenna connector to the antenna output, and a DC voltage network. The DC voltage network is connected to the switch and is arranged to automatically control the switch to connect the external antenna connector to the antenna output and disconnect the receive antenna from the antenna output, when the terminal is connected to the external antenna connector.

14 Claims, 7 Drawing Sheets

SWITCHABLE ANTENNA ARRANGEMENT

RELATED APPLICATIONS

The present application is a 35 U.S.C. §371 national phase application of PCT International Application No. PCT/EP2004/002088, having an international filing date of Mar. 2, 2004, and claiming priority to European Patent Application No. 03006033.9, filed Mar. 19, 2003, U.S. Provisional Patent Application Ser. No. 60/457,150, filed Mar. 24, 2003, and U.S. Provisional Patent Application Ser. No. 60/460,022, filed Apr. 3, 2003, the disclosures of which are incorporated herein by reference in their entireties. The above PCT International Application was published in the English language and has International Publication No. WO 2004/084427 A1.

FIELD OF THE INVENTION

The present invention relates to an antenna arrangement, and more specifically to an antenna arrangement for use in wideband communication wherein a transmitter and a receiver of a communication apparatus, such as a portable radio terminal, are active simultaneously.

BACKGROUND OF THE INVENTION

In wide band communication, such as according to the UMTS (Universal Telecommunications Systems) standard using the telecommunication technology WCDMA (Wideband Call Division Multiple Access), the transmitter and the receiver of a portable radio communication apparatus are active simultaneously. Also, it is often required that a portable radio communication apparatus, such as a mobile telephone, in addition to an internal or external mounted antenna comprises an external antenna connector, to which an auxiliary antenna can be connected. The auxiliary antenna may be embodied as an external car antenna, which is adapted to provide an antenna signal, which is common for all operating frequencies of the mobile telephone. As a consequence of these requirements, the front end RF architecture of the communication apparatus, which is common to the receiver and transmitter circuits gets quite complicated with many components introducing signal losses between the antenna and the receiver. The RF architecture requires e.g. transmit and receive signals to be fed to a filter, such as a diplex filter, in order to combine the signals to a common antenna outlet and/or a common external antenna outlet, such as the external antenna connector, of the communication apparatus. Conventionally, the receiver and the transmitter of the communication apparatus are connected to the antenna through the filter, which facilitates the simultaneous two-way communication.

A further requirement in telecommunication technology is to facilitate dual or multi-mode communication functionality. Therefore, the communication apparatus comprises additional receiver and transmitter circuits for communicating over frequency bands other the frequency band of the WCDMA mode, such as the 900 MHz GSM (Global System for Mobile communication) and the 1800 DCS (Digital Cellular System). If dual or multi-mode communication is provided, additional antenna mode circuits/switches and filters have to be provided. However, the circuits/switches between the WCDMA receiver and the antenna of the mobile terminal will still introduce the unfavorable amount of insertion losses degrading the WCDMA receiver performance. In a typical mobile terminal having an internal antenna combined with an external antenna connector provided in the signal path between the WCDMA receiver and the auxiliary antenna connected via an antenna connector and coaxial cable, the RF-loss budget can be:

| | |
|---|---|
| Diplex filter | 3.0 dB |
| Multi-mode antenna switch | 0.5 dB |
| Combining filter | 0.5 dB |
| External antenna connector | 0.2 dB |
| Coaxial cable and connector | 0.8 dB |
| Sum | 5.0 dB |

The components between the receiver circuits and the antenna introduce obviously substantial losses when the communication apparatus is utilized in the WCDMA mode. Also, if a common external antenna connector is provided, the antenna signal should be common for all frequency bands of operation. As can be seen above, in particular the diplex filter provided for the simultaneous two-way communication of the WCDMA mode introduces substantial losses.

In the communication technology, it is known to provide separate transmit and receive antennas in a communication apparatus. However, if it is preferred to also provide an external antenna connector in such an apparatus a selection problem will arise. If the receiver is connected to both the receive antenna and an auxiliary antenna via the external antenna connector a selection problem will be introduced. Somehow selection between the signal from the receive antenna or the auxiliary antenna has to be provided.

SUMMARY OF THE INVENTION

Embodiments of the present invention can provide an antenna arrangement for facilitating simultaneous two-way communication in a wideband communication multiple access (WCDMA) communication system, wherein the antenna arrangement decreases the signal losses of the received signal compared to the known prior art. More specifically, embodiments of the invention can provide an antenna arrangement comprising an external antenna connect for connecting an auxiliary antenna to at least one receiver of the communication apparatus. Further, embodiments of the invention can provide an antenna arrangement for multi-mode communication in different frequency bands, wherein the communication is performed using different communication modes.

According to one aspect of the invention, the foregoing are achieved by an antenna arrangement for a portable communication apparatus, comprising: a receive antenna, an external antenna connector for receiving a terminal of an auxiliary antenna, and antenna output means an antenna detector, which is arranged to detect that a terminal is connected to said connector, and a switch means. The switch means is adapted to connect either said receive antenna or said connector to said output means.

The receive antenna may be optimized for receiving signals in a first frequency band. Further, the arrangement may comprise a main antenna optimized for transmitting in a second frequency band.

The external antenna connector may be provided in the signal path between the main antenna and the antenna output means.

The antenna arrangement may further comprise antenna input means being electrically or operatively engageable to the external antenna connector or the main antenna. The antenna input means and the antenna output means may each be operatively connected to a common filter for separating the signals to the output means and the signals from the input means. The filter may be engageable to either the main antenna or the external antenna connector.

The switch means may be provided in the signal path between the external antenna connector and the antenna output means and in the signal path between the receive antenna and the antenna output means.

The antenna detector and the switch means may be operatively connected, and the detector may be adapted to operate a connector switch provided in the external antenna connector. The connector switch together with a DC voltage network may form a control means, which is adapted to automatically control the switch.

The external antenna connector may be connected to a DC voltage network, which is arranged to set the switch means to a first mode when the detector is in a first position, wherein a connector switch of the external antenna connector in a first position is operatively engaging the main antenna and disengaging the external antenna connector. The DC voltage network is also arranged to set the switch means to a second mode when the detector is in a second position, wherein the detector operates the connector switch to a second position for disengaging the main antenna and engaging the antenna connector.

The detector may be a resilient pin arranged in a cavity of the external antenna connector, the pin is in the first position when terminal is received in the external antenna connector, and arranged to be forced to the second position by the terminal when received in the external antenna connector.

The antenna arrangement may comprise a signal strength measurement unit having a first and second measurement branch. The first branch is operatively connected to the receive antenna and the switch means and the second branch is operatively engageable to the main antenna or the external antenna connector by means of a connector switch and to the switch means.

The control means may be a controller adapted to control the switch based on the signal received from the detector.

The arrangement may further comprise a first and a second antenna switch means for switching between different operation modes of the antenna arrangement. The first antenna switch means is connected to a diplex filter and a combine filter, and is arranged to pass signals to the antenna output means and from the antenna input means, or either of a second antenna output means and antenna input means. The second antenna switch is connected to the combine filter and arranged to pass signals from the main antenna or the external antenna connector to a third antenna output means or from a third antenna input means. The first antenna switch means is adapted to provide switching between a wideband antenna mode and receive or transmit states of a second operation mode, and the second antenna switch means is adapted to provide switching between receive or transmit states of a third operation mode.

The receive antenna may be a WCDMA (wideband call division multiple access) receive only antenna. Furthermore, the main antenna may be optimized for transmission in the WCDMA frequency band, and reception and transmission in the GSM and/or DCS frequency bands.

The antenna arrangement may be comprised in a mobile radio terminal, such as a mobile telephone.

Embodiments of the invention can also provide a method for controlling the receive mode of an antenna arrangement having a receive antenna and an external antenna connector for receiving a connector of an auxiliary antenna therein.

According to a second aspect of the invention, the foregoing is achieved by a method for controlling a receive apparatus comprising antenna output means, a receive antenna, and an external antenna connector for receiving a terminal of an auxiliary antenna. According to the method, the steps of determining that a terminal is connected to said connector, and controlling a switch means to connect either said receive antenna or said connector to said output means is carried out.

The switch means may be to controlled to operatively connect the receive antenna to the antenna output means when it is determined that no terminal is received in the external antenna connector. Alternatively, the switch means may be controlled to operatively connect either the receive antenna or a main antenna to the antenna output means when it is determined that no terminal is received in the external antenna connector.

According to the invention, the method may also comprise the steps of: measuring the signal condition of a signal received by the receive antenna; measuring the signal condition of a corresponding signal received by the main antenna; determining which of the received signals has the best signal condition; and controlling the switch means to operatively connect the one of said antennas that is receiving the signal having the best signal condition to the antenna output means.

According to a third aspect of the invention, a computer program product is provided, which is directly loadable into the memory of a portable communication apparatus having digital computer capabilities, comprising software code portions for performing the steps according to the method of the invention, whereby said switch means is adapted to connect either said receive antenna or said connector to said output means when said product is run by said communication apparatus.

Further preferred embodiments of the invention are defined in the dependent claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features, and advantages of the invention will appear from the following description of several embodiments of the invention, wherein various aspects of the invention will be described in more detail, reference being made to the accompanying drawings, in which.

DETAILED DESCRIPTION OF EMBODIMENTS OF THE IVENTION

Figure 1:
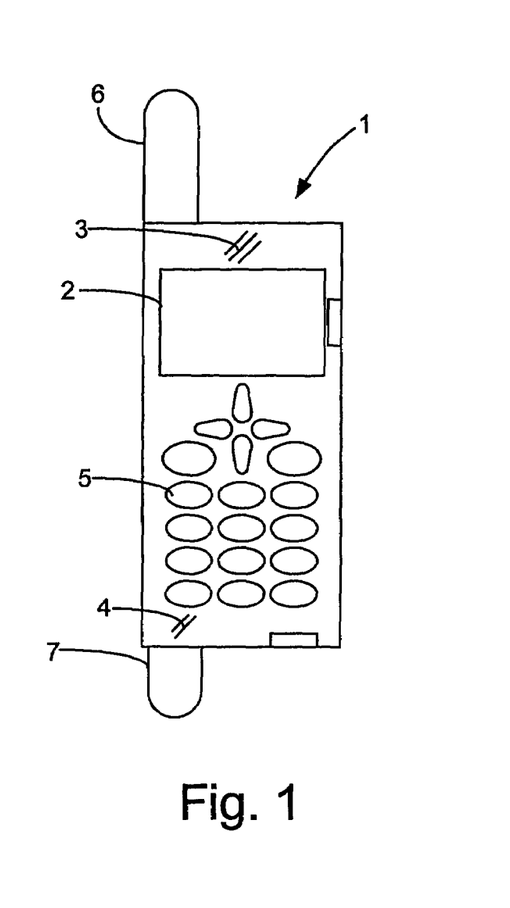
FIG. 1 is a front view of a mobile telephone having a main antenna and a receive antenna.

FIG. 1 discloses a mobile telephone 1 having a man-machine interface for operating the mobile telephone 1 comprising, but not limited to, a display 2, a loudspeaker 3, a microphone 4, and a keypad 5. Furthermore, the mobile telephone 1 has an antenna arrangement comprising a main antenna 6 and a receive antenna 7. The main antenna 6 and/or the receive antenna 7 may be arranged outside of the housing but may as well be provided as internal antennas within the housing of the mobile telephone 1. The antennas 6, 7 are adapted to communicate signals in an over-the-air interface when operated in a wireless communication system.

Figure 2:
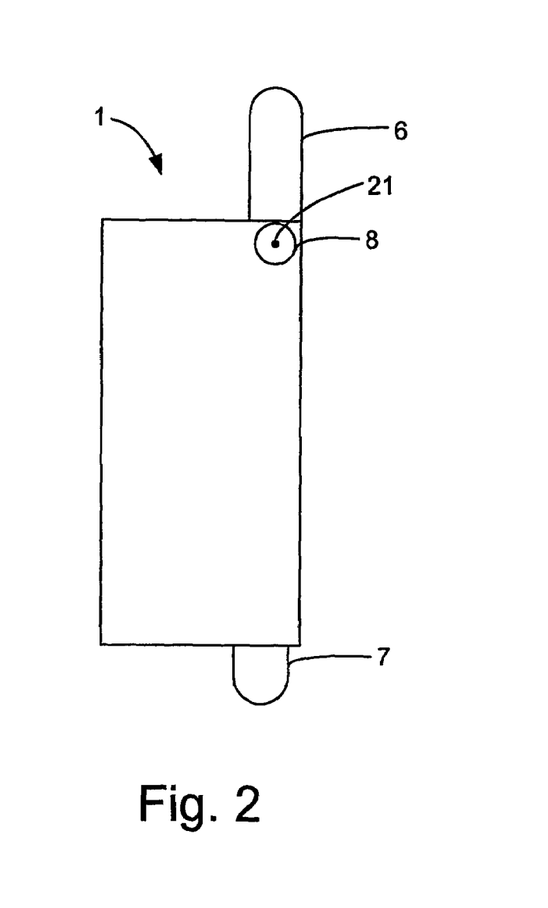
FIG. 2 is a backside view of the mobile telephone of FIG. 1 comprising an external antenna connector.
Figure 3:
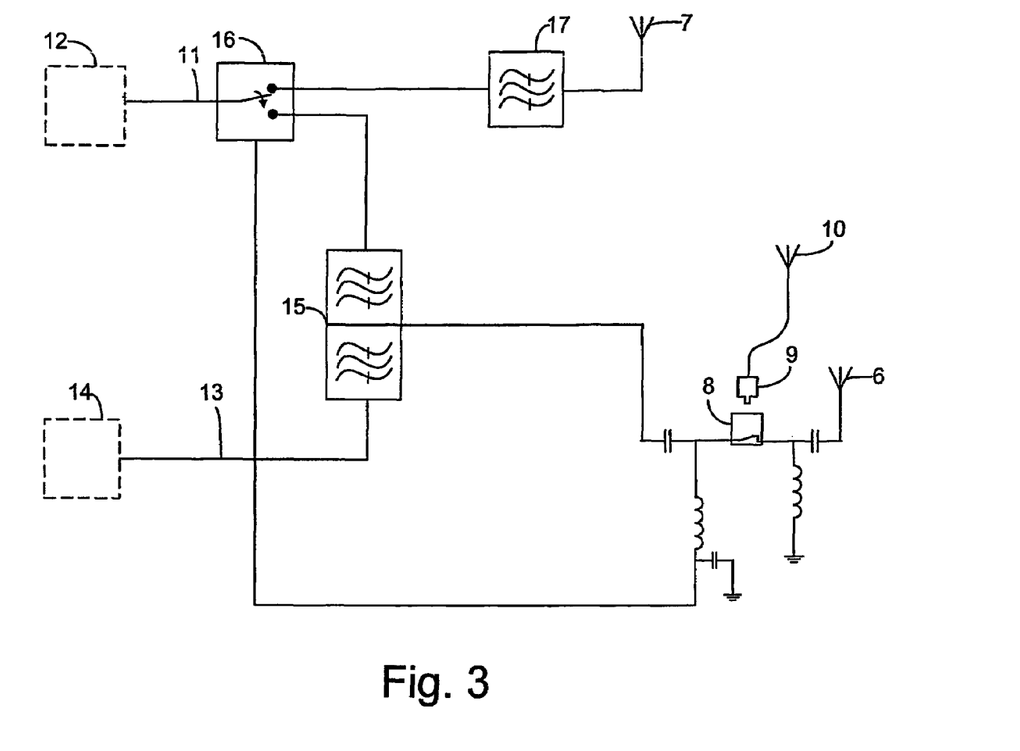
FIG. 3 is a block diagram of a first embodiment of the antenna arrangement according to the invention.

FIG. 2 shows the backside of the mobile telephone 1 comprising an external antenna connector 8 according to the invention for connecting an auxiliary antenna to the antenna arrangement of the mobile telephone 1. The external antenna connector may be provided at different positions of the casing, such as at the bottom or top end of the casing. The external antenna connector 8 is arranged for receiving a coaxial cable antenna connector or terminal 9 operatively connected to an auxiliary antenna 10 by means of a coaxial cable as shown in FIG. 3. The auxiliary antenna may be embodied as a car mounted external antenna connectible to the mobile telephone 1 by means of a handsfree kit mounted in the car. Alternatively, the auxiliary antenna may be an external antenna for providing an amplified signal in remote areas wherein the signal strength is to weak to be received merely by the main antenna 6 or the receive antenna 7.

FIG. 3 discloses a first embodiment of the inventive antenna arrangement, comprising an antenna output means 11 operatively connected to a receiver 12, which may be an integrated circuit (IC) of the mobile telephone 1. The antenna arrangement also comprises an antenna input 13 means operatively connected to a transmitter (Tx) 14. In this embodiment, the mobile telephone 1 is adapted for communication in a wideband mode, such as according to the Wideband Call Division Multiple Access (WCDMA) technique used for the Universal Telecommunications Systems (UMTS) standard in the 1900-2170 MHz frequency range. A first filter 15, such as a diplex filter, is provided in the signal path between the main antenna 6 and the receiver 12 and the transmitter 14, respectively.

In the embodiment of FIG. 3, the external antenna connector 8 is provided in the signal path between the main antenna 6 and the diplex filter 15. The antenna arrangement comprises a switch 16 for selecting the output signal from the antenna arrangement to the receiver 12 from either the receive antenna 7 or the main antenna 6 or possibly the auxiliary antenna 10 if connected. The antenna switch 16 is controlled by the insertion of a terminal of the auxiliary antenna 10, as will be described below.

Alternatively, the switch 16 is operated by a controller, whereby it is possible to provide a diversity antenna arrangement, wherein the strongest of the signals received by the main antenna 6 or the receive antenna 7 is output to the WCDMA receiver 12.

The receive antenna 7 is optimized for operating at a first frequency band, such as the receive band of the WCDMA operating frequency, which e.g. is 2140-2155 MHz according to the UMTS standard. As the receive antenna 7 is optimized to operate at a limited bandwidth at a relatively high frequency, the receive antenna 7 may by made relatively small in size. Thus, the receive antenna 7 may be placed in the lower part of the mobile telephone 1 close to the radio circuitry, which in general is provided on an IC located in this part of the mobile telephone 1. Consequently, the signal does not have to pass a through a long coaxial cable having high losses, as the receive antenna 7 may be directly connected to the IC of a printed circuit board without the intermediation of any coaxial cable. This in turn relaxes the demands on attenuation of an accompanying band-pass (BP) filter 17 provided in the signal path between the receive antenna 7 and the receiver 12. The distance between the main antenna 6 and the receive antenna 7 introduces some RF-isolation as compared to the diplex filter receiver branch. This isolation is generated from the over-the-air path-loss between the two antennas. The insertion loss of the separate antenna BP filter 17 is therefore smaller than that of the diplex filter 15. Loss budget for the separate receive antenna 7 is in one exemplifying embodiment:

| | |
|---|---|
| BP filter | 2.0 dB |
| SPDT switch | 0.5 dB |
| Sum | 2.5 dB |

This is a considerable loss improvement of at least 2.5 dB compared to prior art, where no separate receive antenna 7 is provided. Additionally, the receive antenna 7 can be made more efficient compared to when it is a part of the main antenna 6 as it may be constructed as a narrow band antenna. Also, the combined size of the antennas may be reduced.

Figure 4:
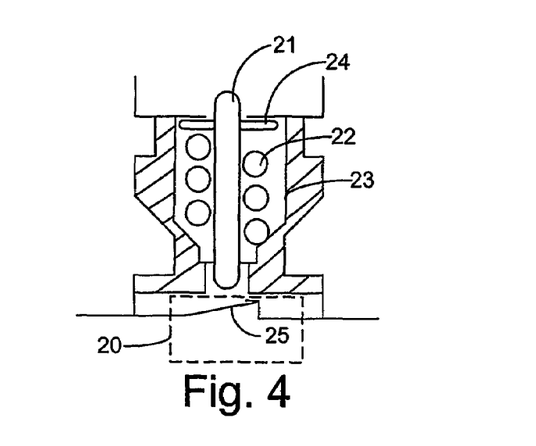
FIG. 4 is a cross sectional view of a first embodiment of the external antenna connector of the mobile telephone shown in FIG. 1.

FIG. 4 shows an embodiment of the external antenna connector 8 in a cross sectional view in more detail. The connector 8 comprises a connector switch 20, such as a conducting lever arm 25, for connecting either the auxiliary antenna 10 or the main antenna 6 to the signal path to the diplex filter. The main antenna 6 is automatically disconnected from the diplex filter 15, when the terminal 9 is received in the external antenna connector 8.

In the embodiment shown in FIG. 4, a pin 21 makes contact with the terminal 9 and outputs the signal from the terminal 9 to the receiver 12, or receives signals from the transmitter 14. The pin 21 is biased upwards in FIG. 4 by means of a spring 22. The pin 21 and the spring 22 are received in a cavity 23 enclosing the spring 22. A plate or rod 24 connected to the pin 21 retains the pin and the spring 22 in the cavity 23. The spring 22 urges the pin 21 towards a first upper position shown in FIG. 4 when no terminal 9 is received in the external antenna connector 8. Also, when the pin 21 is in its first upper position, the lever arm 25 is in a first closed position, wherein the connector switch 20 connects the main antenna 6 to the diplex filter 15, and disconnects the auxiliary antenna. When the terminal 9 is received in the external antenna connector 8, the pin 21 will be forced downwards by said terminal 9 to a second lower position, wherein the pin 21 forces the lever arm 25 to a second opened position. Consequently, the main antenna 6 will be disconnected from the diplex filter 15 and the external antenna connector 8 and consequently the auxiliary antenna will be connected to said filter 15. In the embodiment illustrated in FIG. 4, the pin 21 is made of an electrically conducting material, such as gold, copper, etc. Therefore, the signals from the auxiliary antenna will be forwarded to the leverarm 25, which is also made of such a conducting material for forwarding the signal to the diplex filter 15, to which it is operatively connected.

In the embodiment of FIG. 4, the pin 21 acts as a detector for detecting that the terminal 9 of the auxiliary antenna is received in the external antenna connector 8. The connector switch 20 together with the DC voltage network described below will provide a control means for automatically controlling the switch 16, as will be described below.

In wideband communication, the receiver 12 and the transmitter 14 are operating simultaneously. Therefore, filter 15 is a diplex filter comprising two band-pass filters, which are adapted to separate the uplink and downlink signals, respectively. Also, the diplex filter 15 provides communication between the receiver 12 and the main antenna 6 or the external antenna connector 8, and between the transmitter 14 and the main antenna 6 or the external antenna connector 8, respectively. As should be noticed, the main antenna 6 of the antenna arrangement may be optimized for only transmission in a frequency band other than the operating frequency band of the receive antenna, as will be further described below.

Figure 5A:
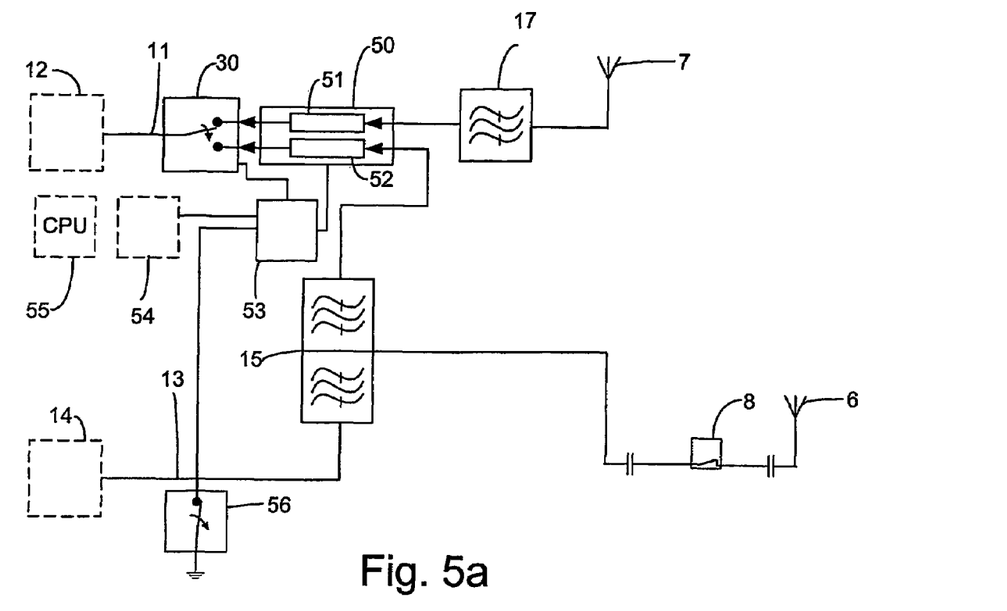
FIG. 5a is a block diagram of a second embodiment of the antenna arrangement according to the invention, wherein diversity reception is enabled.

FIG. 5a illustrates an alternative embodiment of the antenna arrangement according to the invention, wherein a diversity option of the invention is implemented. Components that are the same as those of the embodiment of FIG. 3 and FIG. 4 are denoted by the same reference numerals. The connector of the diplex filter 15 connected to the switch 16 in the previous embodiment is now connected to a signal strength measurement unit 50. The unit 50 comprises a first measurement branch 51 and a second measurement branch 52. The first measurement branch 51 is operatively connected to the receive antenna 7, via the band-pass filter 17, and to a baseband switch 30. The second measurement branch 52 is operatively connected to the diplex filter 15 and the switch 30. Each measurement branch 51, 52 is adapted to measure the signal strength of the received signal, such as the signal-to-noise ratio (S/N) or a Received Signal Strength Indication (RSSI). Then, each measured signal strength is supplied to a controller 53, such as an integrated circuit. The controller 53 is adapted to determine which of the signals received by the receive antenna 7 or the main antenna 6 has the highest S/N or signal strength. The controller 53 is also connected to the baseband switch 30, which is controlled by the controller 53 based on said determination. When it is determined that either the signal strength of the signal from the main antenna 6 or the receive antenna 7 exceeds the other by a certain amount, the controller 53 can control the switch 30 to select the receiver branch having the best signal condition. The controller 53 may be connected to a memory 54, such as a Read Only Memory (ROM) or a Random Access Memory (RAM) capable of storing software code portions as will be explained below.

The embodiment of FIG. 5a comprises a normally closed switch 56 for detecting when the connector 8 is connected to the auxiliary antenna 10. The normally closed switch, such as a Hall-element based switch or a reed switch, is adapted to detect e.g. a magnetic field when the mobile telephone 1 is connected to a mating device, which indicates that the auxiliary antenna 10 is received in the connector. The detection of the auxiliary antenna 10 will cause the switch 56 to open, thus disconnecting the connection to ground and the switch 30 will be controlled to select the auxiliary antenna.

Figure 5B:
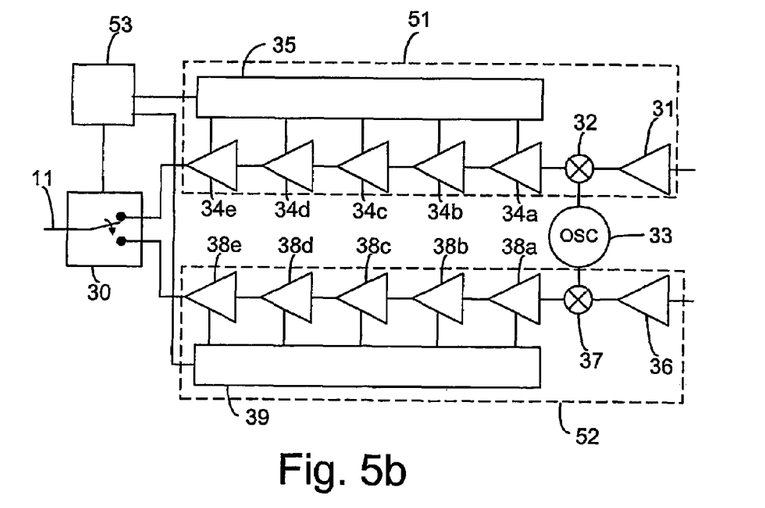
FIG. 5b is a block diagram of one embodiment of a signal strength measurement unit according to the invention.

FIG. 5b illustrates one embodiment of the implementation of the signal strength measurement unit 50. The first measurement branch 51 comprises a Low Noise Amplifier (LNA) 31 operatively connected to the receive antenna 7. The output of the LNA 31 is connected to a mixer 32 for down-converting the RF signal to a base-band signal. The mixer is therefor connected to an oscillator 33 generating a signal having a suitable frequency. The output of the mixer 32 is connected to a chain of amplifiers 34a-e. Each amplifier 34a-e is connected to a signal strength indicator means 35 for determining e.g. a RSSI, to be forwarded to the controller 53. Each amplifier 34a-34d is connected to the following amplifier, which will further augment the signal. The last amplifier 34e of the amplifier chain is connected to the baseband switch 30, which is controlled by the controller 53 to generate a signal at the antenna output 11. The second measurement branch corresponds to the first measurement branch and comprises consequently a LNA 36, a mixer 37 connected to the oscillator 33, an amplifier chain 38a-38e, and a signal strength indicator means 39. The controller 53 may determine, which of the received signals that should by output at the antenna output based on the RSSI received from each measurement branch 51, 52.

In an alternative embodiment for implementing diversity reception, two receivers are provided. The switch 16 is provided after the receivers, which are connected to the receive antenna 7 and the diplex filter 15, respectively. The switching is e.g. controlled based on largest signal power, largest signal-to-noise ratio, Maximum Ratio Combining etc. The preferred received signal is then forwarded to circuitry within the mobile telephone for further processing.

As an alternative to provide the controller 53 as a separate integrated circuit, said controller 53 may form part of another component of the antenna arrangement, such as the signal strength measurement unit 50. Also, the controller may be implemented using a central processing unit (CPU) 55 of the mobile telephone 1.

The controller 53 may alternatively be connected to the external antenna connector 8. When the detector 21 (see FIG. 4) identifies a terminal 9 received in the external antenna connector 8, the controller 53 will receive an auxiliary antenna present notification signal from the external antenna connector 8. The notification can be provided by a DC signal switching from a low to a high signal level, or vice versa, (see FIG. 7) at an input terminal of the controller 53.

Alternatively, a proximity sensor arranged in the external antenna connector 8 may detect the connector of the auxiliary antenna when received therein, and generate a notification signal accordingly. The proximity sensor may detect e.g. that an electromagnetic field is present in the connector 8 Then, the controller 53 can control the switch 16 to select the signal received via the external antenna connector 8 of the diversity antenna arrangement, and maintain that signal until the auxiliary antenna is disconnected.

A device mating the mobile telephone 1, such as a car cradle, can support the mobile telephone in a hands-free mode. The mating device can have a magnet for generating a magnetic field provided, which a reed switch or Hall-element based switch within the housing of the mobile telephone can detect the presence of and thus operate the switch 16, possibly via the controller 53 when appropriate.

Figure 7:
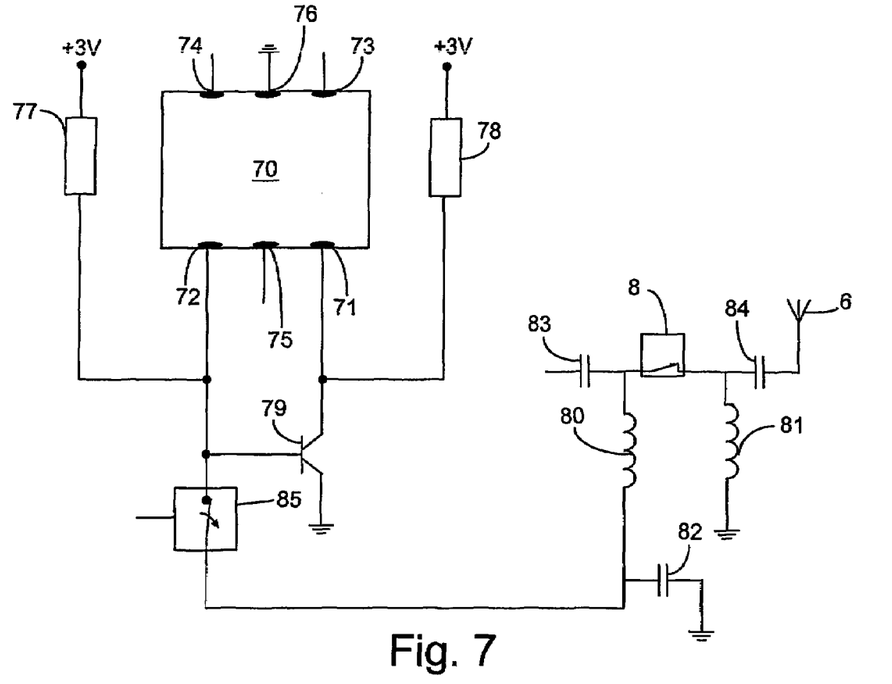
FIG. 7 is a block diagram of a switch means connected to a DC network.

The grounding of the DC network at the output side of the connector 8 may in yet an alternative embodiment be provided with an external ground connection instead of via the inductor 81. Connecting the mobile telephone 1 to e.g. a mating device, such as the cradle, would provide the grounding of the DC-network. Connecting the mobile terminal to the external device would inevitably connect the ground connection, which may be used as an indicator for detecting the terminal 9. This would however require that the polarity of the switching is changed.

Still another alternative is to use conventional diversity operation without any external antenna, whereby unit 50 determines which of the signals from receive antenna 7 and main antenna 6 is best for reception purpose, such as having largest S/N.

Figure 6:
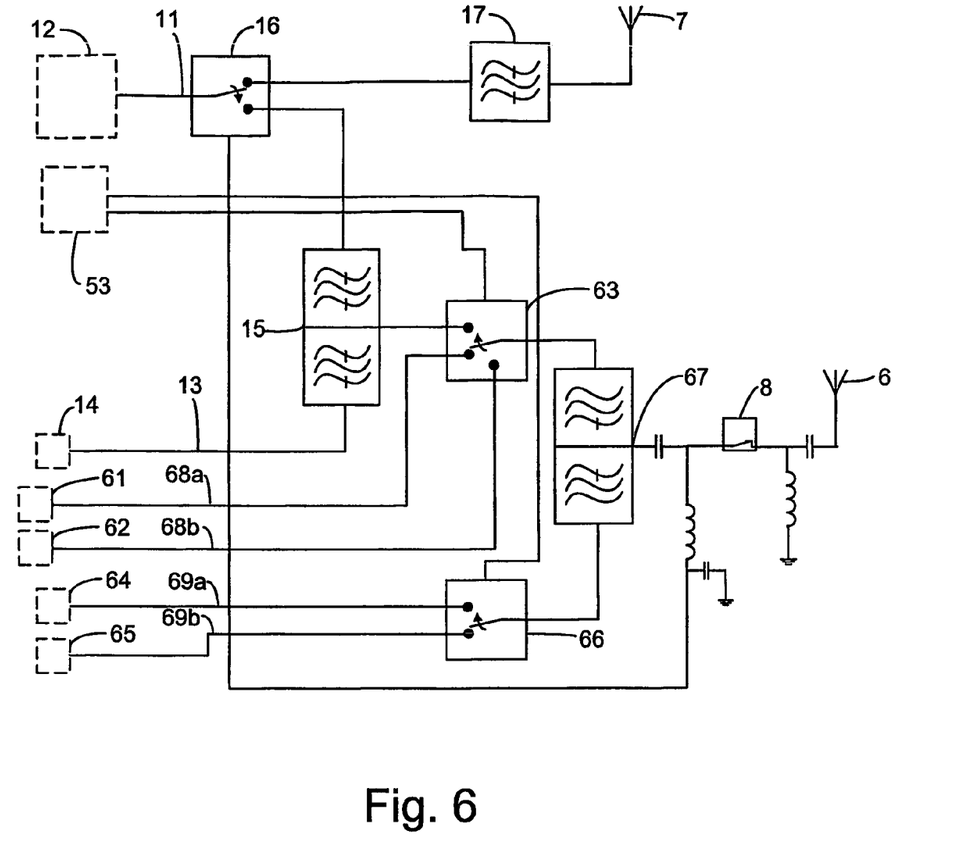
FIG. 6 is a block diagram of a third embodiment of the antenna arrangement according to the invention, wherein multi-mode communication is provided.

FIG. 6 illustrates yet another embodiment of the present invention, wherein a multi-mode antenna arrangement is implemented. The mobile telephone 1 is adapted for communication not only in a WCDMA mode in a high frequency, but also in at least a second communication mode, such as according to GSM in the 900 MHz range. Additionally, in the embodiment shown in FIG. 6 the antenna arrangement of the mobile telephone 1 is adapted for communication in a third mode, such as according to DCS in the 1800 MHz frequency band. Therefore the circuitry of the mobile telephone 1 comprises transmitter and receiver circuitry for the GSM and DCS modes, respectively. A DCS transmitter 61, connected to a second antenna output means 68a), and receiver 62, connected to a second antenna input means 68b, respectively, e.g. provided as integrated circuits of the mobile terminal 1 are connected to a first antenna switch 63, which is provided in the signal path between the diplex filter 15 and the main antenna 6. The first antenna switch 63 is adapted to switch between the WCDMA mode and the DCS receive mode and DCS transmit mode, since the receiver and the transmitter in DCS communication are not active simultaneously. Furthermore, a GSM transmitter 64 and receiver 65, may be connected to a third antenna output means 69a and input means 69b, respectively. The GSM transmitter and receiver 64, 65, which may be provided as integrated circuits of the mobile telephone 1, are connected to a second antenna switch 66, which is adapted to switch between GSM transmit mode and GSM receive mode, respectively, since the transmitter and the receiver are not active simultaneously in GSM communication. Moreover, the first and second antenna switch 63, 66 are connected to the controller 53, which is adapted to control the operation of the antenna switches 63, 66 to select the relevant operation mode. The controller may be provided as an integrated circuit. Alternatively the controller 53 may be implemented by the CPU 55.

The antenna switches 63, 66 are also operatively connected to a combine filter 67, which is operatively connected to the external antenna connector 8 and the main antenna 6. The combine filter 67 is a combined high pass and low pass filter adapted to pass signals to/from the DCS and WCDMA receiver/transmitter and to/from the GSM receiver/transmitter, respectively.

In the embodiment of FIG. 6, the main antenna 6 transmits signals only in the WCDMA transmit frequency band, while it transmits and receives signals in the DCS and GSM frequency bands. Therefore, the bandwidth requirement of the main antenna 6 may be optimized for the GSM uplink and downlink frequency bands of 890-915 MHz and 935-960 MHz, the DCS uplink and downlink frequency bands of 1710-1785 MHz and 1805-1880 MHz, and the WCDMA uplink frequency band of 1920-1980 MHz. Consequently, it is required that the bandwidth of the upper frequency band of the main antenna 6 is only 270 MHz, whereas an antenna covering all frequency ranges, such that has to be provided when diversity reception is facilitated, has to have an upper bandwidth of 460 MHz.

If the main antenna 6 is used only for WCDMA transmission, the auxiliary antenna 10 may still be adapted to provide both WCDMA transmission and reception in combination with DCS and GSM communication, i.e. an all-bands antenna covering the appropriate operating frequency ranges of the mobile telephone 1. Therefore, the switch 16 is either automatically operated by the connector switch 20, or by the controller 53 to select the auxiliary antenna 10 when the WCDMA mode is selected.

FIG. 7 is a block diagram of an embodiment of a switch 70 for selecting the signal from either the receive antenna 7 or the main antenna 6/external antenna connector 8 according to the invention, and components involved for controlling the switch 16. The switch 16 may be implemented as a Single Pole Double Throw (SPDT) semiconductor switch, which is operated from a DC source. SPDT switches may utilize PIN-diodes, GaAs FETs (Field Effect Transistors), JFETs (Junction Field Effect Transistors) or MEMS (Microelectromechanical Systems) technology. One such switch, which may be used in the present invention, is commercially available from NEC Compound Semiconductor Devices, Ltd., Japan, having part number µPG153TB, which is a SPDT GaAs FET switch. The switch 70 comprises six terminals; two control terminals 71, 72, two output terminals 73, 74, one input terminal 75, and one ground terminal 76. Each of the control terminals 71, 72 are connected to a +3V DC voltage via a first and a second resistor 77, 78. Further, the first control terminal 71 is connected to an inverting transistor 79. In the embodiment shown, the inverting transistor is chosen as a BJT transistor, which is commercially available from Philips Semiconductors, the Netherlands, having part number BC817. However, the inverting transistor may also be implemented using other transistors, such as a MOS transistor. The collector of the transistor 79 is connected to the first control terminal 71 and consequently to +3V DC via the second resistor 78. The emitter of the transistor is connected to ground. The base of the transmitter 79 is connected to the second control terminal 72, and consequently to +3V DC via the first resistor 77.

Moreover, the second control terminal 72 is connected to the output terminal of the antenna connector 8, more precisely to the connection point between the external antenna connector 8 and the diplex filter 15, via a first AC blocking inductor 80. The connection point between the external antenna connector 8 and the main antenna 6 is referenced to ground via a second AC blocking inductor 81. Furthermore, the second input terminal 72 of the SPDT switch 70 is connected to ground via a first capacitor 82. Also, DC blocking capacitors 83, 84 are provided between the the external antenna connector 8 and the RF front end components, such as the diplex filter 15 and the combine filter 67, as well as between the main antenna 6 external antenna connector 8. In the embodiment of FIG. 7, the sizes of the components are: first and second resistors 22 kΩ; first and second inductor 56 nH; first capacitor and DC blocking capacitors 33 pF.

The output terminals 73, 74 of the SPDT switch 70 are connected to the diplex filter 15 and the receive antenna 7, respectively, and the input terminal 75 is connected to the input terminal of the WCDMA receiver 12.

In operation, the DC network described above will automatically control the SPDT switch 70. When the connector switch 20 of external connector 8 is in its first closed position, i.e. no connector of an auxiliary antenna is received in the external connector 8, the DC network will have a ground reference via the second inductor 81. Therefore, the input signal at the first control terminal 71 of the SPDT switch 70 will be high, and the signal at the second control terminal 72 will be low. Therefore, the SPDT switch 70 selects its second output terminal 74 to be connected to its input terminal 75, i.e. the receive antenna 7 will be connected to the WCDMA receiver 12. However, when an antenna connector of an auxiliary antenna is received in the external antenna connector 8, the pin 21 will open the connector switch 20, wherein the DC connection to ground via the second inductor 81 will be disconnected. Consequently, the input signal at the first control terminal 71 of the SPDT switch 70 will be low and the input signal at its second control terminal 72 will be high. Therefore, the SPDT switch 70 is controlled to select its first output terminal 73 to be connected to its input terminal 75, i.e. diplex filter 15 will be connected to the WCDMA receiver 12.

In an alternative embodiment, not shown, the controller 53 is adapted to control the SPDT switch 70. Therefore, the control terminals 71, 72 of the SPDT switch 70 are connected to the controller 53. Also, the controller 53 is connected to the DC network illustrated in FIG. 7, and is adapted to determine whether the connector switch 20 is open or closed and control the switch 70 accordingly. Alternatively, the controller 53 controls the switch 16, 70 independently of the connector 8, or receives an connector present notification signal from an electronic detection means of the controller.

When the embodiment of FIG. 7 is utilized for the diversity option, a controllable series switch 85 connected to the controller 53 is provided in the signal path between the control terminal 72 and the AC blocking inductor 80. The series switch 85 is e.g. provided as a series transistor. The controller can thus select either the main antenna 6/the auxiliary antenna 10 or the receive antenna 7. However, the series switch 85 is not necessary when the diversity option is not utilized. In such a case (not shown), the control terminal 72 is directly connected to said inductor 80.

Figure 8:
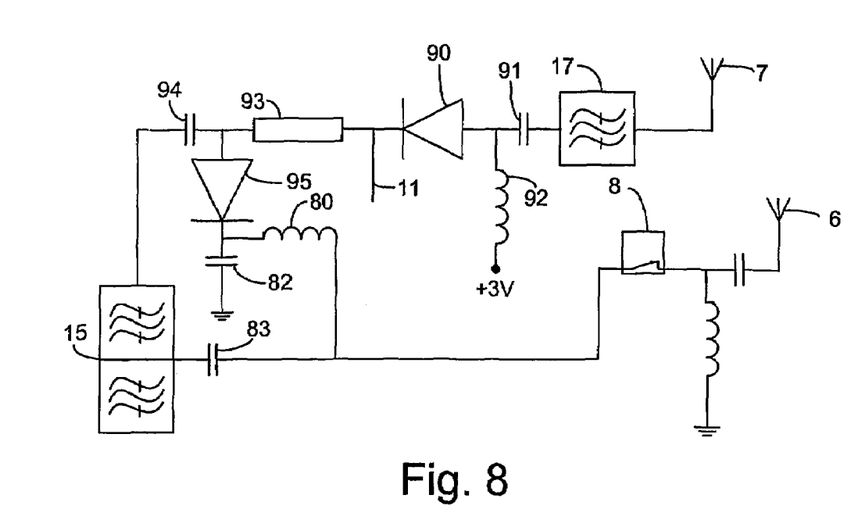
FIG. 8 is a block diagram of one embodiment of a switch used in the present invention.

FIG. 8 discloses one embodiment for implementing the switch 16 with discrete components. A first PIN diode 90 is connected with its anode to a DC blocking capacitor 91, which is connected to the band pass filter 17, and to +3V DC via a first AC blocking inductor 92. The cathode of the first diode 90 is connected to the antenna output 11 of the antenna arrangement and to one end of a quarter wave microstrip 93. The microstrip 93, which may be implemented with a printed patch on an integrated circuit, is short-circuited for high frequency signals when biased by a DC voltage and conducting otherwise. In the embodiment shown in FIG. 8, the microstrip 93 is short-circuited for signals in the 2 GHz frequency range when biased, and may be implemented with an approximately 2 cm long patch. However, other frequencies are also possible, wherein the length of the patch is varied. The microstrip 93 is at its other end connected to a DC blocking capacitor 94, which is connected to the diplex filter 15, and to the anode of a second PIN diode 95. The cathode of the second diode 95 is connected to the previously described (see FIG. 7) capacitor 82 and AC blocking inductor 80. The sizes of the components of FIG. 8 are: inductors 56 nH, capacitors 33 pF. Any commercially available diode, such as the PIN diode having model number BAR 14 from Infineon Technologies AG, Germany, may be used as the diode 90, 94.

In operation, the switch implemented according to FIG. 8 will connect the receive antenna 7 to the antenna output 11 when the connector switch 20 is in its closed position, whereby the microstrip 93 will be biased by the DC voltage. When a terminal 9 is received in the external connector 8, the DC voltage applied over the connector 8, and consequently the bias over the first diode 90, will be disconnected and the switch arrangement of FIG. 8 will select the external antenna connector 8 to the antenna output 11.

In still an alternative embodiment, the need of an SPDT switch is unnecessary. Two separate Low Noise Amplifiers (LNA) of the WCDMA receiver is connected to the receive antenna 7 and the diplex filter 15, respectively. Each of the LNA is operated by applying a voltage when either the receive antenna 7 or the diplex filter 15 should be connected to the receiver. The LNAs are typically integrated in an IC together with the other components of the WCDMA receiver 12. Alternatively to powering the LNAs alternately, the switching can be provided with switching means after the LNAs within the IC comprising the WCDMA receiver.

Figure 9:
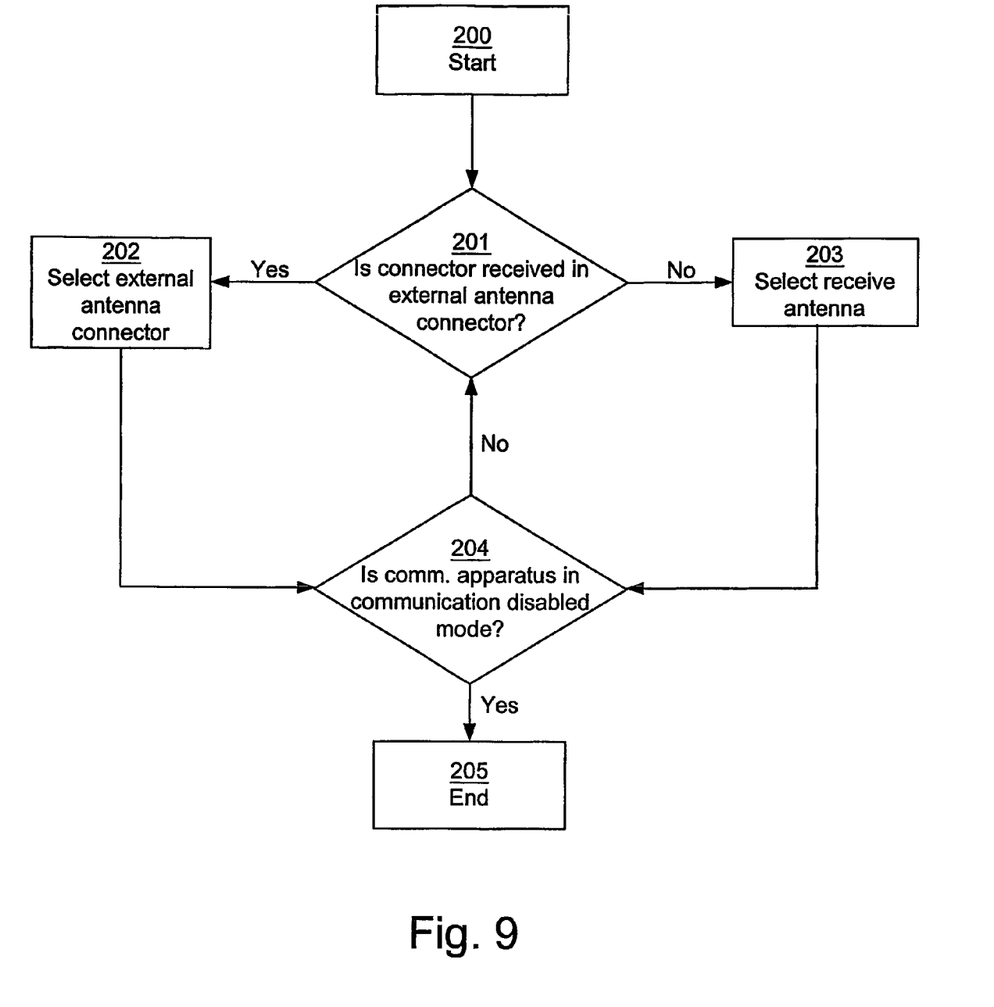
FIG. 9 is a flow-chart of a first embodiment of the method according to the invention.

FIG. 9 illustrates a first embodiment of the method according to the invention for controlling the receive mode of the antenna arrangement, wherein diversity receive is not provided. The procedure for controlling the switch starts in a first step 200, such as when the mobile telephone 1 is switched on or set to a mode, in which communication is enabled. Then, in a second step 201, it is determined whether the external antenna connector 8 is in electrical or operative connection with an auxiliary antenna, e.g. by detecting whether an antenna connector is received in the external antenna connector 8. If yes, the procedure continuous in step 202, wherein the switch 16, 70 selects the signal from the auxiliary antenna, i.e. the WCDMA receiver 12 is operatively connected to the external antenna connector 8. However, if the answer in step 201 is no, the procedure continuous in step 203, wherein the signal from the receive antenna 7 is selected by the switch 16, 70, i.e. the WCDMA receiver 12 is operatively connected to the receive antenna 7. The procedure proceeds to step 204 from step 202 or step 203, wherein it is determined whether the communication apparatus is set to a mode, wherein communication is no longer enabled although the communication apparatus is switched on. If the answer in step 204 is affirmative, the procedure proceeds in step 205, wherein the procedure is ended. However, if the answer in step 204 is negative the procedure continuous in step 201. The procedure may be repeated until the mobile terminal is set to a communication disabled mode or switched off, whereby the procedure is completely abandoned.

Figure 10:
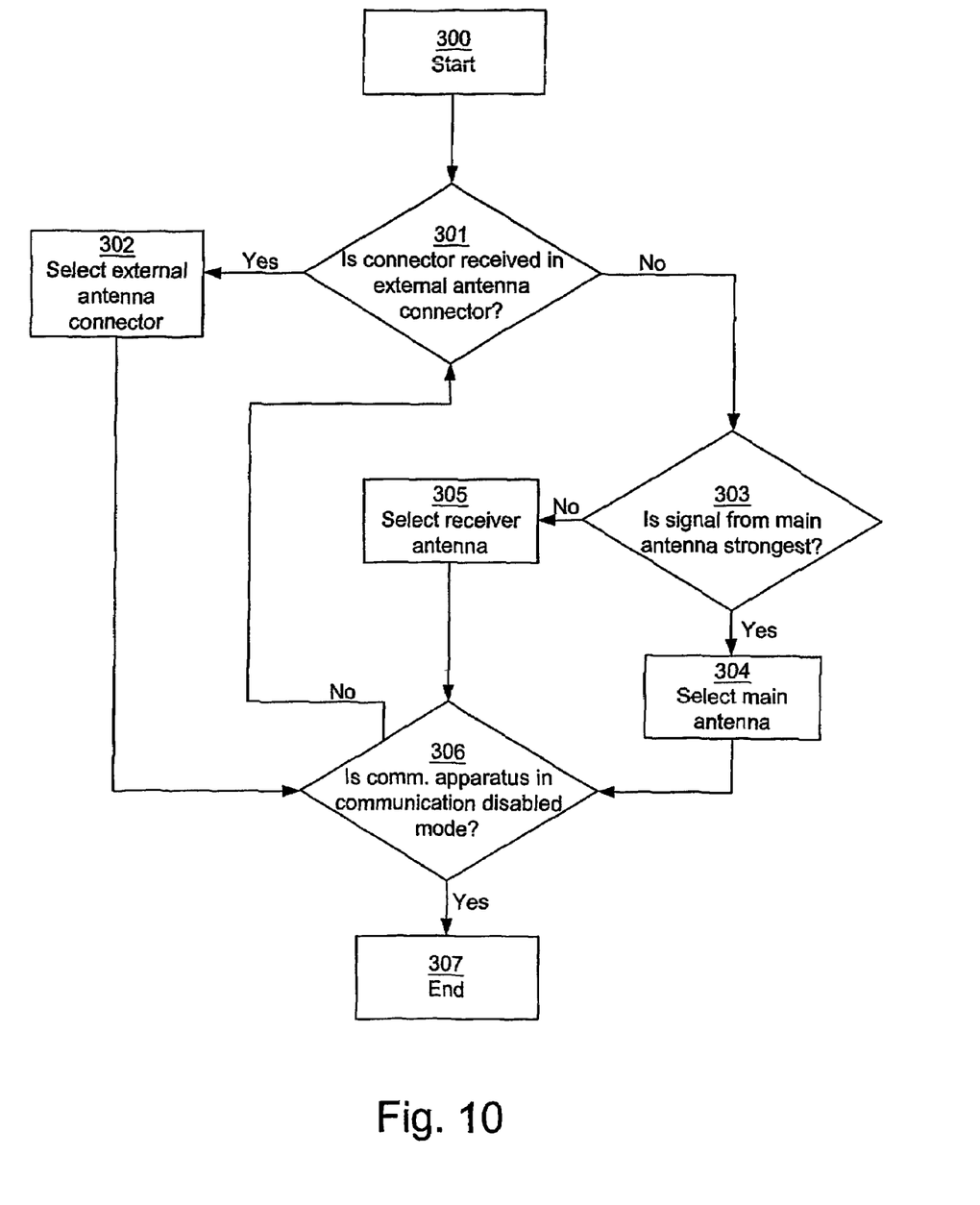
FIG. 10 is a flow-chart of a second embodiment of the method according to the invention.

FIG. 10 illustrates an alternative embodiment of the method according to the invention for controlling the receive mode of the antenna arrangement, wherein diversity reception is provided. The procedure for controlling the switch starts in a first step 300, such as when the mobile telephone 1 is switched on and/or switched to a communication enabled mode. Then, in a second step 301 it is determined whether the external antenna connector 8 is in electrical or operative connection with an external antenna, such as by detecting whether an antenna connector is received in the external antenna connector 8. If so, the procedure continuous in step 302, wherein the switch 16, 70 selects the signal from the auxiliary antenna, i.e. antenna output 11 is operatively connected to the external antenna connector 8. However, if the answer in step 301 is negative, the procedure continuous in step 303, wherein it is determined whether the signal from the main antenna 6 is stronger than the signal from the receive antenna 7. If so, in step 304 the switch 16, 70 is controlled to connect the antenna output 11 to the main antenna 6. However, if the answer in step 303 is no, in step 305 the switch 16, 70 selects the signal from the receive antenna 7, i.e. the antenna output 11 is operatively connected to the receive antenna 7. From step 302, 304 and 305, the procedure proceeds to step 306, wherein it may be determined whether the communication apparatus is set to a communication disabled mode as described above. If the answer in step 306 is affirmative, the procedure proceeds in step 307, wherein the procedure is ended. However, if the answer in step 306 is negative the procedure continuous in step 301. The procedure may then be repeated until the mobile terminal is switched off or set to a communication disabled mode.

The controller 53 may execute the procedures illustrated with reference to FIGS. 8 and 9. The controller 53 receives information from the external antenna connector 8, and optionally from the signal strength measurement unit 50, and controls the switch 16 accordingly. The procedure may be provided by a software product comprising software code portions for performing the steps according to the invention when said product is run by e.g. the controller 53 of the mobile telephone 1. Therefore, the controller 53 should have digital computer capabilities. The software may be load into the memory 54 of the mobile telephone 1, to which the controller 53 has access, or into a register of the controller 53 containing appropriate control algorithms therein.

The present invention has been described above in relation to a mobile telephone 1. However, the invention is not limited to a mobile telephone 1, but can be included in any portable radio communication apparatus, such as a mobile radio terminal, a pager, or a communicator, i.e. an electronic organizer, a smartphone or the like. Further, the present invention has been described in relation to connecting the main antenna or the receive antenna to a WCDMA receiver. However, the invention is not limited to a WCDMA technology.

The present invention has been described above with reference to specific embodiments. However, other embodiments than the above described are equally possible within the scope of the invention. Different method steps than those described above, performing the method by hardware or software, may be provided within the scope of the invention. The different features and steps of the invention may be combined in other combinations than those described. The invention is only limited by the appended patent claims.

The invention claimed is:

1. An antenna arrangement for a portable communication apparatus, comprising:
   a main antenna connectable to an antenna input;
   a receive antenna connectable to an antenna output;
   an external antenna connector for receiving a terminal of an auxiliary antenna;
   an antenna detector arranged to detect the terminal when it is connected to said external antenna connector;
   a common filter, having a first, a second, and a third port, for separating signals to the antenna output and from the antenna input;
   a switch adapted to connect either said receive antenna or said first port to said antenna output, wherein the antenna input is operatively connected to said second port; and
   a DC voltage network, which is connected to the switch and the antenna detector, and which is arranged to automatically control the switch to connect the external antenna connector to the antenna output and disconnect the receive antenna from the antenna output, when the terminal is connected to the external antenna connector, wherein the main antenna is automatically disconnected from the antenna input by a connector switch when the terminal is connected to the external antenna connector;
   wherein said third port is connectable to either the main antenna or the external antenna connector, such that the antenna input is electrically or operatively connectable to the external antenna connector or the main antenna.

2. The antenna arrangement according to claim 1, wherein the receive antenna is optimized for only receiving signals in a first frequency band, and wherein the main antenna is optimized for only transmitting in a second frequency band.

3. The antenna arrangement according to claim 2, wherein both the first frequency band and the second frequency band belong to a first telecommunication system.

4. The antenna arrangement according to claim 2, wherein the main antenna is further optimized for reception and transmission in a second and/or a third telecommunication system.

5. The antenna arrangement according to claim 3, wherein the receive antenna is a WCDMA receive only antenna.

6. The antenna arrangement according to claim 4, wherein the main antenna is optimized for transmission in a WCDMA frequency band, and reception and transmission in a GSM and/or a DCS frequency band.

7. The antenna arrangement according to claim 1, wherein the external antenna connector is provided in a signal path between the main antenna and the antenna output.

8. The antenna according to claim 1, wherein the switch provided in a signal path between the external antenna connector and the antenna output and in a signal path between the receive antenna and the antenna output.

9. The antenna arrangement according to claim 1, wherein the antenna detector and the switch are operatively connected, and the antenna detector is adapted to operate a connector switch provided in the external antenna connector, said connector switch together with the DC voltage network forming a control means, which is adapted to automatically control the switch.

10. The antenna arrangement according to claim 1, wherein the external antenna connector is connected to the DC voltage network, which is arranged to set the switch to a first mode when the antenna detector is in a first position, wherein a connector switch of the external antenna connector in a first position is operatively engaging the main antenna and disengaging the external antenna connector, and to set the switch to a second mode when the antenna detector is in a second position, wherein the antenna detector operates the connector switch to a second position for disengaging the main antenna and engaging the antenna connector.

11. The antenna arrangement according to claim 9, wherein the antenna detector is a resilient pin arranged in a cavity of the external antenna connector, the pin is in a first position when the terminal is received in the external antenna connector, and arranged to be forced to a second position by the terminal when received in the external antenna connector.

12. The antenna arrangement according to claim 1, further comprising a first antenna switch and a second antenna switch to switch between different operation modes of the antenna arrangement, the first antenna switch is connected to a diplex filter and a combine filter, and is arranged to pass signals to the antenna output and from the antenna input, or either of a second antenna output and a second antenna input; the second antenna switch is connected to the combine filter and arranged to pass signals from the main antenna or the external antenna connector to a third antenna output or from a third antenna input; the first antenna switch is adapted to provide switching between a wideband antenna mode and receive or transmit states of a second operation mode, and the second antenna switch is adapted to provide switching between receive or transmit states of a third operation mode.

13. A mobile radio terminal comprising an antenna arrangement, the antenna arrangement including:
   a main antenna connectable to an antenna input;
   a receive antenna connectable to an antenna output;
   an external antenna connector for receiving a terminal of an auxiliary antenna;
   an antenna detector arranged to detect the terminal when it is connected to said external antenna connector;
   a common filter, having a first, a second, and a third port, for separating signals to the antenna output and from the antenna input;
   a switch adapted to connect either said receive antenna or said first port to said antenna output, wherein the antenna input is operatively connected to said second port; and
   a DC voltage network, which is connected to the switch and the antenna detector, and which is arranged to automatically control the switch to connect the external antenna connector to the antenna output and disconnect the receive antenna from the antenna output, when the terminal is connected to the external antenna connector, wherein the main antenna is automatically disconnected from the antenna input by a connector switch when the terminal is connected to the external antenna connector;
   wherein said third port is connectable to either the main antenna or the external antenna connector, such that the antenna input is electrically or operatively connectable to the external antenna connector or the main antenna.

14. The mobile radio terminal according to claim 13, wherein the mobile radio terminal is a mobile telephone.

* * * * *

UNITED STATES PATENT AND TRADEMARK OFFICE
CERTIFICATE OF CORRECTION

PATENT NO. : 7,511,681 B2 Page 1 of 1
APPLICATION NO. : 10/549054
DATED : March 31, 2009
INVENTOR(S) : Bolin

It is certified that error appears in the above-identified patent and that said Letters Patent is hereby corrected as shown below:

On Title Page:
Item 30, Foreign Application Priority Data:
After "Mar. 19, 2003 (EP) ..... 03006033" please add -- .9 --

Column 5, Line 9: Please make correction in title "IVENTION"
to read -- INVENTION --

Signed and Sealed this

Ninth Day of June, 2009

JOHN DOLL
*Acting Director of the United States Patent and Trademark Office*